US010663330B2

(12) United States Patent
Kimura (10) Patent No.: US 10,663,330 B2
(45) Date of Patent: *May 26, 2020

(54) ELECTROPOTENTIAL DETECTION ELECTRODE OF ELECTROMAGNETIC FLOW METER

(71) Applicant: Azbil Corporation, Tokyo (JP)

(72) Inventor: Koji Kimura, Tokyo (JP)

(73) Assignee: Azbil Corporation, Tokyo (JP)

( * ) Notice: Subject to any disclaimer, the term of this patent is extended or adjusted under 35 U.S.C. 154(b) by 11 days.

This patent is subject to a terminal disclaimer.

(21) Appl. No.: 16/219,279

(22) Filed: Dec. 13, 2018

(65) Prior Publication Data

US 2019/0186966 A1 Jun. 20, 2019

(30) Foreign Application Priority Data

Dec. 15, 2017 (JP) .................................. 2017-240991

(51) Int. Cl.
*G01F 1/58* (2006.01)
*G01F 23/24* (2006.01)
*G01N 27/06* (2006.01)

(52) U.S. Cl.
CPC .............. *G01F 1/588* (2013.01); *G01F 1/584* (2013.01); *G01F 23/24* (2013.01); *G01N 27/06* (2013.01)

(58) Field of Classification Search
CPC .................................... G01F 1/58; G01F 23/24
See application file for complete search history.

(56) References Cited

U.S. PATENT DOCUMENTS

2019/0186965 A1* 6/2019 Kimura ................... G01F 1/588

FOREIGN PATENT DOCUMENTS

| JP | H02-16024 U | 2/1990 |
|---|---|---|
| JP | H06-23936 Y2 | 6/1994 |

(Continued)

OTHER PUBLICATIONS

Korean Intellectual Property Office, "Notification of Reason for Refusal," issued in Korean Patent Application No. KR 10-2018-0160782, which is a Korean counterpart of U.S. Appl. No. 16/219,279, dated Oct. 11, 2019, 7 pages (3 pages of English Translation of Korean Office Action, 4 pages of Original Korean Office Action).

*Primary Examiner* — Jewel V Dowtin
(74) *Attorney, Agent, or Firm* — Amster, Rothstein & Ebenstein LLP (57) ABSTRACT

An electropotential detection electrode includes a main body portion including a liquid-contact portion exposed into a measurement tube and formed by covering a base material with a conductor and a terminal portion electrically connected to the conductor. The main body portion includes a small diameter portion having a cylindrical shape and a large diameter portion having a disc shape extending outward from the small diameter portion in a radial direction. The terminal portion includes an electrically conductive body having a cylindrical body that accommodates the large diameter portion fitted therein and a shaft portion extending from the electrically conductive body in a direction opposite from the main body portion. The large diameter portion is provided on an outer peripheral portion thereof with an annular recessed portion that defines an annular groove between the large diameter portion and the cylindrical body.

2 Claims, 6 Drawing Sheets

(56) References Cited

FOREIGN PATENT DOCUMENTS

| JP | H08-271302 A | 10/1996 |
|---|---|---|
| JP | 2018-146274 A | 9/2018 |

\* cited by examiner

RELATED ART

Fig. 9

RELATED ART

ELECTROPOTENTIAL DETECTION ELECTRODE OF ELECTROMAGNETIC FLOW METER

CROSS-REFERENCE TO RELATED APPLICATION

The present application claims the benefit of and priority to Japanese Patent Application No. 2017-240991, filed on Dec. 15, 2017, the entire contents of which are incorporated by reference herein.

TECHNICAL FIELD

The present invention relates to an electropotential detection electrode of an electromagnetic flow meter, which has a main body portion comprising a liquid-contact portion covered with an electrically conductive material.

BACKGROUND

Some electromagnetic flow meters of the related art are configured to extract an electromotive force generated in a fluid flowing in a measurement tube by using an electropotential detection electrode. The electropotential detection electrode, typically made of a stainless steel, is made of various materials depending on corrosiveness of detection targets. Examples of electrode materials having high corrosive resistance include precious metal materials such as platinum as disclosed, for example, in PTL 1 in many cases. The precious metal materials have such a disadvantage as having difficulty to achieve desired shapes depending on the shape due to their low strength. In order to solve the disadvantage as described above, forming an electrode by using a non-precious metal material as a base metal and covering the electrode with a precious metal material is conceivable as described in PTL 1.

However, when an abrasive substance is included in the fluid flowing in the measurement tube, the precious metal material covering the electrode may be peeled off. In addition, the precious metal material covering the electrode may be peeled off due to an impact applied to the measurement tube, corrosion of the measurement tube, or a defect at the time of manufacture.

When the precious metal material is peeled off, an electrochemical noise is generated due to an electropotential difference between the base metal and the precious metal material. This noise corresponds to an output noise from the electromagnetic flow meter.

Figure 8:
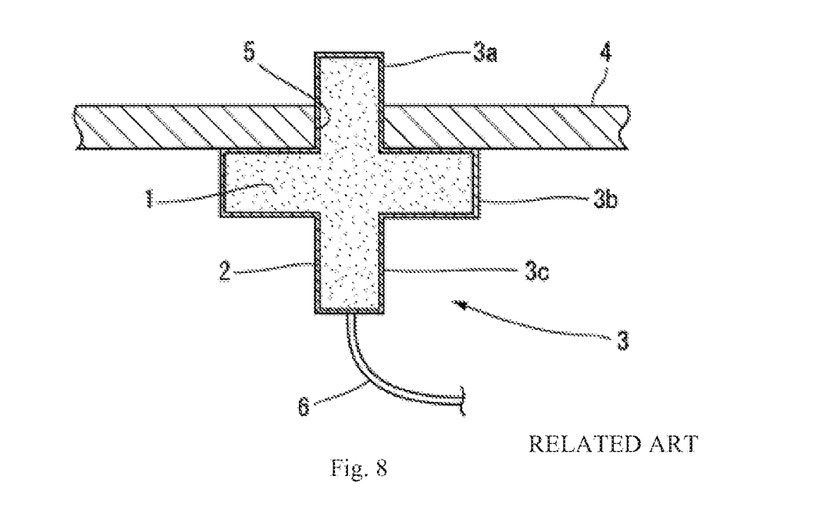
FIG. 8 is a cross-sectional view of an electropotential detection electrode of the related art.

The problem of generation of the noise due to peeling off of the metal material that covers the electrode may be solved by making an electrode body with an insulating material, covering a surface of the insulating material with a precious metal material, and using the precious metal material as a conduction path as proposed by an applicant of the present application in PTL 2. Described in PTL 2 is an electropotential detection electrode 3 having such structure that a base material 1 made of a ceramic, which is an insulating material, is covered with a conductor 2 made of a metal having corrosive resistance as illustrated in FIG. 8. The electropotential detection electrode 3 includes a first small diameter portion 3a to be inserted into a hole 5 formed in a measurement tube 4 for inserting an electrode, a large diameter portion 3b located outside the measurement tube 4, and a second small diameter portion 3c projecting from the large diameter portion 3b in a direction opposite from the first small diameter portion 3a. A lead wire 6 is connected to the second small diameter portion 3c.

Figure 9:
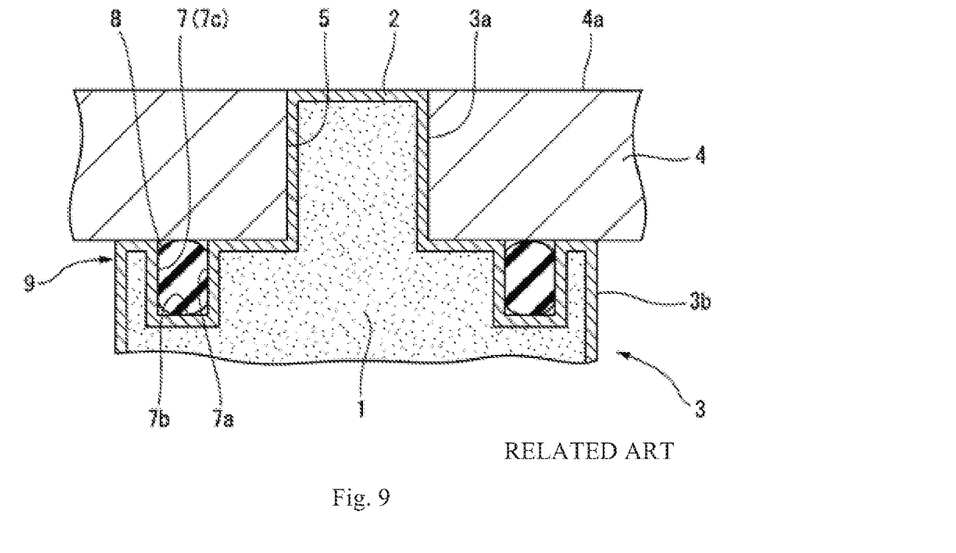
FIG. 9 is a cross-sectional view of an electropotential detection electrode having an annular groove of the related art.

The large diameter portion 3b may be provided with an annular groove 7, as illustrated in FIG. 9. In FIG. 9, the same or similar members as or to those described in conjunction with FIG. 8 are denoted by the same reference signs and detailed description will be omitted. The annular groove 7 is configured to accommodate a gasket 8, and is formed into an annular shape and located on the same axial line as the first small diameter portion 3a. The gasket 8 is configured to seal between a fluid path 4a in the measurement tube 4 and the large diameter portion 3b of the electropotential detection electrode 3.

In this manner, the conductor 2 of the electropotential detection electrode 3 provided with the annular groove 7 is preferably formed by using a metal paste (not illustrated) so that an inner peripheral surface 7a, a bottom surface 7b, and an outer peripheral surface 7c of the annular groove 7 are uniformly covered. The metal paste contains metal powder, and is formed into the conductor 2 by being sintered together with the base material 1 in a state of being applied to the base material 1 and being subjected to metal paste sintering.

CITATION LIST

Patent Literature

[PTL 1] JP-UM-A-2-16024
[PTL 2] Japanese Patent Application No. 2017-038984

SUMMARY

Figure 10:
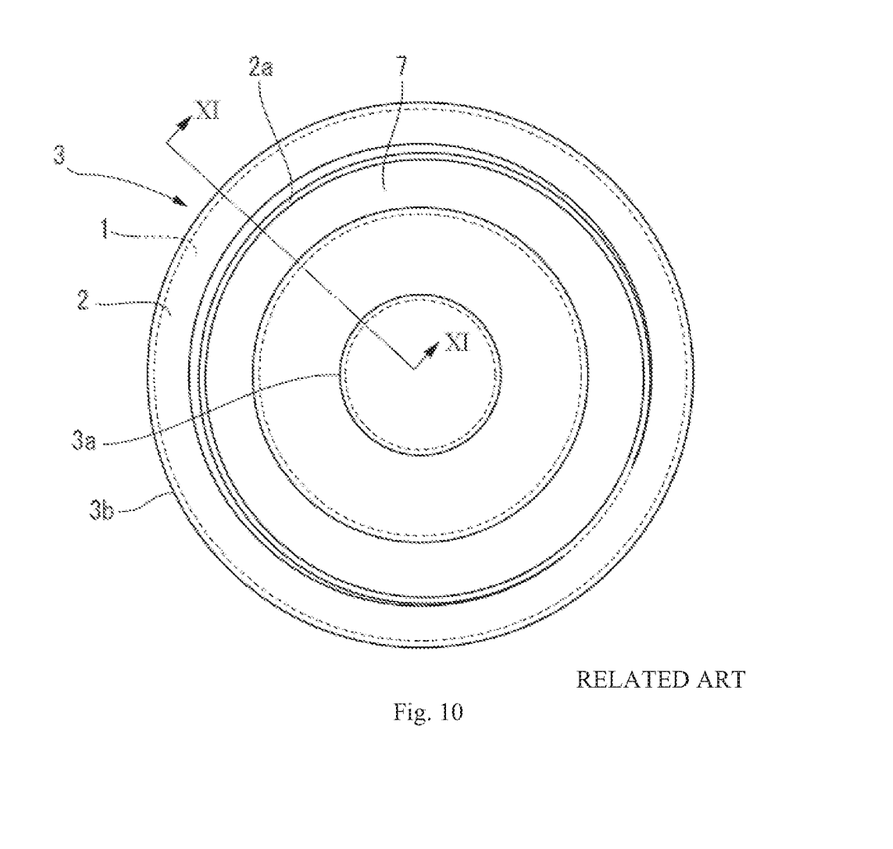
FIG. 10 is a front view of the electropotential detection electrode of the related art with part of a conductor being peeled off.
Figure 11:
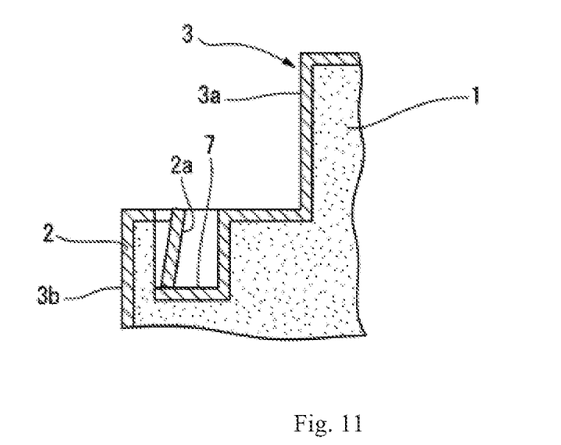
FIG. 11 is a cross-sectional view taken along the XI-XI in FIG. 10.

As illustrated in FIG. 9, the electropotential detection electrode 3, including the annular groove 7, is covered with the conductor 2, and part 2a of the conductor 2 may be peeled off an outer peripheral wall of the annular groove 7, as illustrated in FIG. 10 and FIG. 11. It is because a material having a large linear expansion coefficient contracts to a larger extent due to a difference in linear expansion coefficient during sintering, which generates a contract stress. The contract stress is directed inward in a radial direction. In other words, when the adhesiveness between the base material 1 made of a ceramic and the conductor 2 of the large diameter portion 3b is insufficient, the conductor 2 contracts more than the base material 1, and thus the conductor 2 is peeled off the outer peripheral wall of the annular groove 7 inwardly in the radial direction.

In addition, the conductor 2 tends to be reduced in thickness at corners, projecting outward, of the electropotential detection electrode 3 and thus may fail to have sufficient thickness required for detecting signals. When the thickness is reduced at the corners, reliability in conduction is lowered, and thus conductivity required for detecting signals is not achieved. As illustrated in FIG. 9, when the annular groove 7 is formed in the large diameter portion 3b, a cylindrical portion 9 is formed outside the annular groove 7 in the radial direction, and thus the number of corners with less thickness of the conductor 2 increases correspondingly, which may result in lower reliability in conduction. The problem of reliability as described above occurs not only in the electropotential detection electrode 3 having the annular groove 7 for storing the gasket 8, but also in electrodes provided with an annular groove from other reasons.

It is an object of the present invention to provide an electropotential detection electrode having a high reliability in conduction irrespective of a configuration having an annular groove covered with a conductor.

In order to achieve the object described above, there is provided an electropotential detection electrode of an electromagnetic flow meter according to the present invention comprising: a main body portion having a liquid-contact portion and being formed by covering a base material with an electrically conductive material, the liquid-contact portion being exposed in a measurement tube of the electromagnetic flow meter; and a terminal portion electrically connected to the electrically conductive material, in which the main body portion comprises: a small diameter portion having a cylindrical shape and being inserted at one end thereof into an electrode insertion hole of the measurement tube, the one end corresponds to the liquid-contact portion; and a large diameter portion having a disc shape and connected at one end thereof to other end of the small diameter portion, the large diameter portion extending outward from the small diameter portion in a radial direction, and the terminal portion comprises an electrically conductive body having a cylindrical body that accommodates the large diameter portion fitting therein and having a bottomed cylindrical shape electrically connected to the large diameter portion, and a shaft portion extending from the electrically conductive body in a direction opposite from the main body portion, and any one of an outer peripheral portion of the large diameter portion and an inner peripheral portion of the cylindrical body is provided with an annular recessed portion that constitutes an annular groove between the large diameter portion and the cylindrical body.

According to the electropotential detection electrode of the electromagnetic flow meter of the present invention, the annular groove may be configured to accommodate a gasket.

In the present invention, since an outer peripheral wall of the annular groove is defined by the cylindrical body of the terminal portion, the outer peripheral wall of the annular groove is not included in a conduction path made of an electrically conductive material (hereinafter, referred to simply as "conductor"). Therefore, the conduction path may be made of the conductor except for portions where peeling off of the conductor tends to occur. In addition, compared with a case where the conductor formed in the outer peripheral wall of the annular groove is included in the conduction path, corners that tend to impair the reliability in conduction are reduced, and thus reliability in conduction is increased.

Therefore, according to the present invention, an electropotential detection electrode having high reliability in conduction may be provided irrespective of a configuration having the annular groove and the main body portion covered with the conductor.

DETAILED DESCRIPTION

First Embodiment

Referring now to FIG. 1 to FIG. 5, an embodiment of an electropotential detection electrode of an electromagnetic flow meter according to the present invention will be described in detail below.

Figure 1:
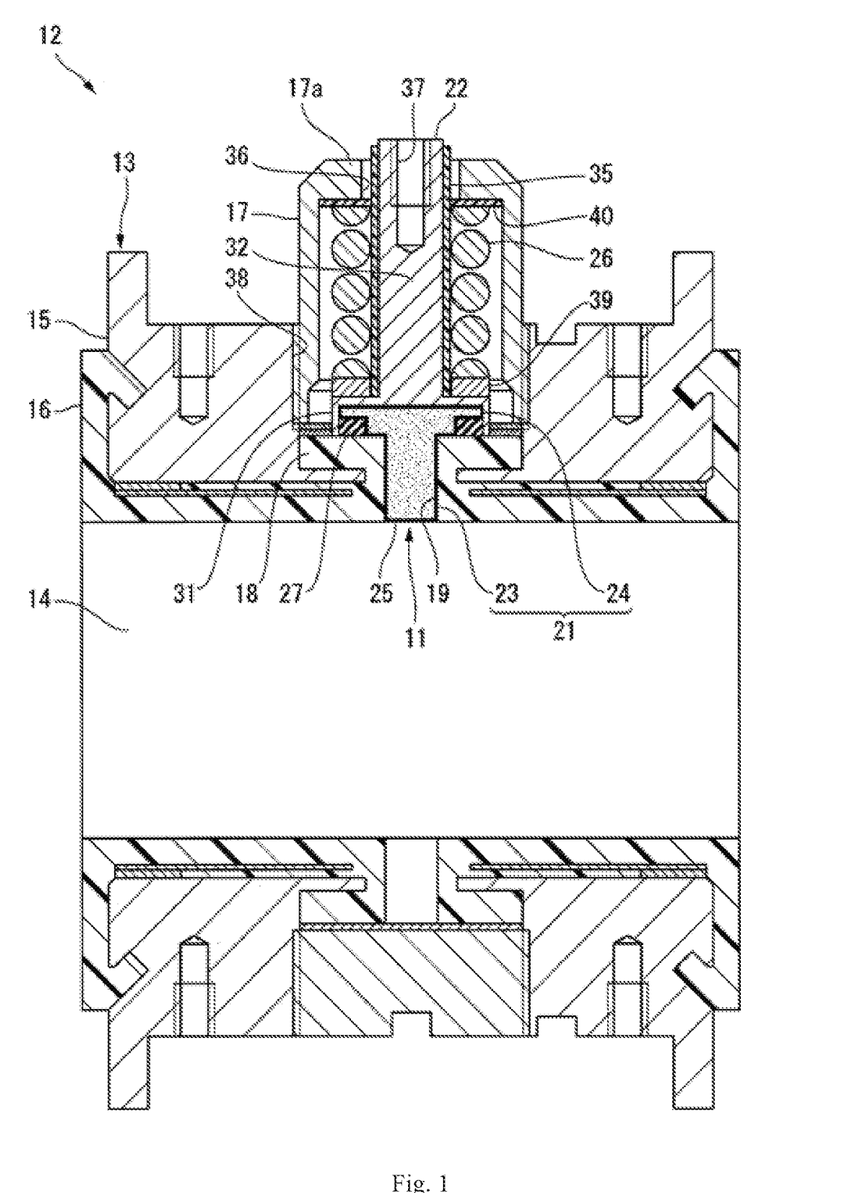
FIG. 1 is a cross-sectional view of an electromagnetic flow meter provided with an electropotential detection electrode according to the present invention.
Figure 2:
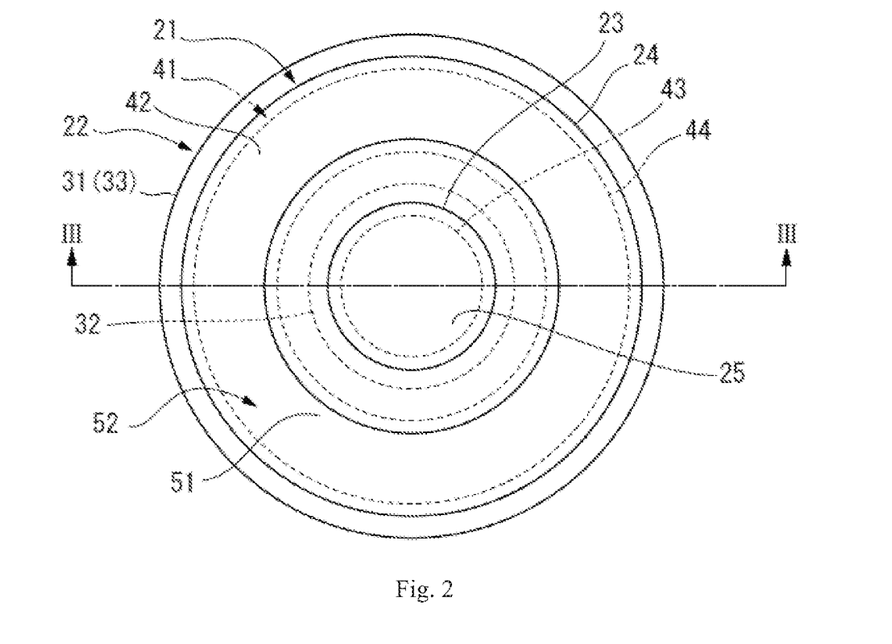
FIG. 2 is a front view of the electropotential detection electrode according to a first embodiment viewed from a pipeline side.

An electropotential detection electrode 11 illustrated in FIG. 1 (hereinafter, referred to simply as an electrode 11) is attached to a measurement tube 13 of an electromagnetic flow meter 12 from outside a fluid path 14.

The measurement tube 13 comprises a main body 15, a lining 16 provided on an inner surface of the main body 15, and an electrode cap 17 having a bottomed cylindrical shape for storing the electrode 11. The lining 16 is integrally provided with an electrode mounting seat 18. The electrode mounting seat 18 is provided with an electrode insertion hole 19 therethrough for inserting the electrode 11.

The electrode 11 according to the embodiment comprises a main body portion 21 inserted into the electrode insertion hole 19 of the lining 16, and a terminal portion 22 formed separately from the main body portion 21 and overlapped with the main body portion 21.

The main body portion 21, which will be described later in detail, comprises a small diameter portion 23 having a cylindrical shape exposed at one end thereof to the fluid path 14 in the measurement tube 13 and a large diameter portion 24 having a disc shape extending from the other end of the small diameter portion 23 outward in a radial direction, as illustrated in FIG. 1 to FIG. 4.

The one end of the main body portion 21 is exposed into the measurement tube 13 and corresponds to a liquid-contact portion 25 that comes into contact with a fluid (not illustrated) flowing in the measurement tube 13. The large diameter portion 24 is formed into a disc shape having an outer diameter larger than the small diameter portion 23 and is urged by a spring force of a compressed coil spring 26, described later, toward the electrode mounting seat 18. A gasket 27 is provided between the large diameter portion 24 and the electrode mounting seat 18.

Figure 3:
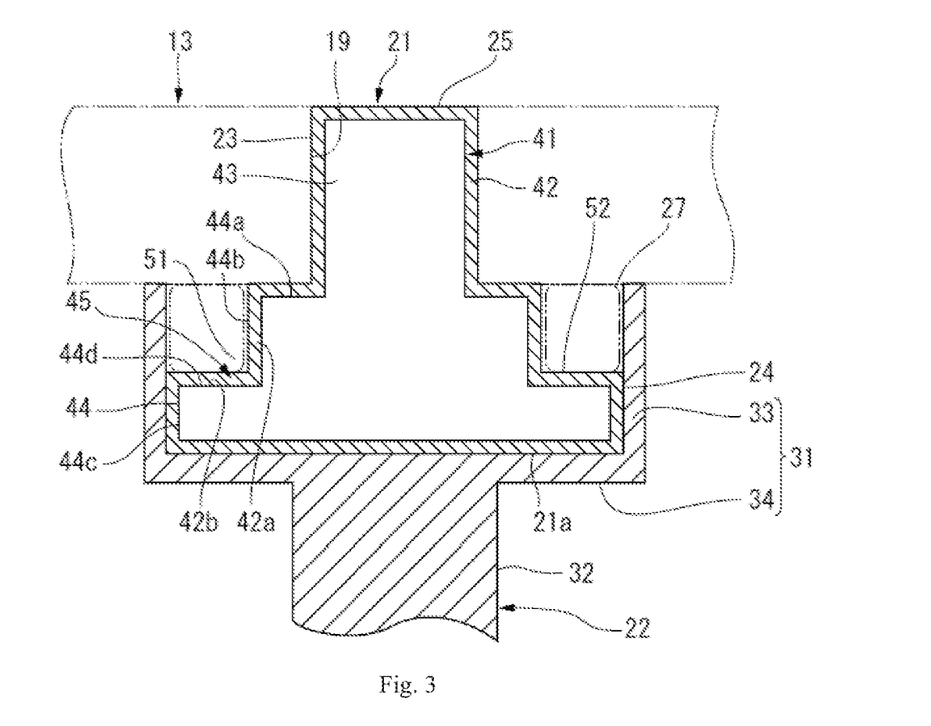
FIG. 3 is a cross-sectional view taken along the line III-III in FIG. 2.
Figure 5:
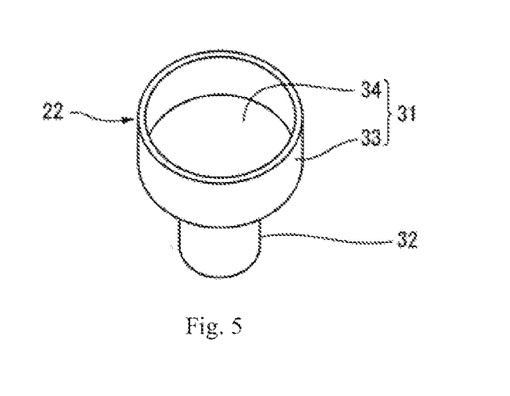
FIG. 5 is a perspective view of a terminal portion according to the first embodiment.

The terminal portion 22 is made of an electrically conductive material into a predetermined shape. The terminal portion 22 according to this embodiment comprises an electrically conductive body 31 having a bottomed cylindrical shape and connected to the large diameter portion 24 of the main body portion 21, and a shaft portion 32 extending from an axial center portion of the electrically conductive body 31 in a direction opposite from the main body portion 21, as illustrated in FIG. 3 and FIG. 5. The electrically conductive body 31 comprises a cylindrical body 33 having a cylindrical shape that fits an outer peripheral surface of the large diameter portion 24, and a disc 34 that comes into face-to-face contact with the other end of the large diameter portion 24. The shaft portion 32 is covered with a cylindrical body 35 made of an insulating material and penetrates through an end wall 17a of the electrode cap 17 and projects out of the electrode cap 17, as illustrated in FIG. 1. The end wall 17a is provided with a through hole 36 formed therethrough and the shaft portion 32 and the cylindrical body 35 pass through the through hole 36. A projecting side end portion of the terminal portion 22 is formed with a screw hole 37 for connecting a lead wire terminal (not illustrated).

The electrode cap 17 has a function to retain the compressed coil spring 26. The electrode cap 17 is screwed into a screw hole 38 of the main body 15 in a state of storing the compressed coil spring 26 in the interior thereof. The compressed coil spring 26 is compressed in a state in which the shaft portion 32 is inserted through a center portion thereof and is accommodated in the electrode cap 17. One end of the compressed coil spring 26 presses the disc 34 of the terminal portion 22 toward the main body portion 21 via a washer 39, and the other end presses the end wall 17a of the electrode cap 17 in a direction opposite from the main body portion 21 via an annular insulating plate 40.

The main body portion 21 of the electrode 11 comprises a base material 41 made of a ceramic, which is an insulating material, and an electrically conductive material covering the base material 41, as illustrated in FIG. 3. In this embodiment, the electrically conductive material covering the base material 41 is simply referred to as a conductor 42. The terminal portion 22 described above is electrically connected to the conductor 42 by being overlapped with the large diameter portion 24 of the main body portion 21.

Examples of the ceramic material that may be used for the base material 41 include SiC, $Al_2O_3$, $ZrO_2$, $Y_2O_3$, $Si_3N_4$, and SiO. The base material 41 is formed by molding a ceramic raw material into a shape of the main body portion 21 with a die (not illustrated) and is formed by sintering the molded object.

The conductor 42 is made of an electrically conductive material. Examples of the electrically conductive material that may be used for forming the conductor 42 include metal materials having corrosive resistance, such as Pt, Ti, Au, Ta, and WC, and also include solder, a synthetic resin material having electric conductivity, and an electrically conductive ink. The conductor 42 according to this embodiment is formed by sintering a metal paste (not illustrated) applied to the base material 41 before sintering together with the base material 41. The metal paste is formed by mixing metal powder and a solvent. By sintering the metal paste, the metal powder is fused and the conductor 42 covering the entire area of an outer surface of the base material 41 is achieved.

The base material 41 of the main body portion 21 is formed of a cylindrical portion 43 constituting the small diameter portion 23 in cooperation with the conductor 42 described above, and a disc portion 44 constituting the large diameter portion 24 in cooperation with the conductor 42 described above. The cylindrical portion 43 and the disc portion 44 are integrally formed.

Figure 4:
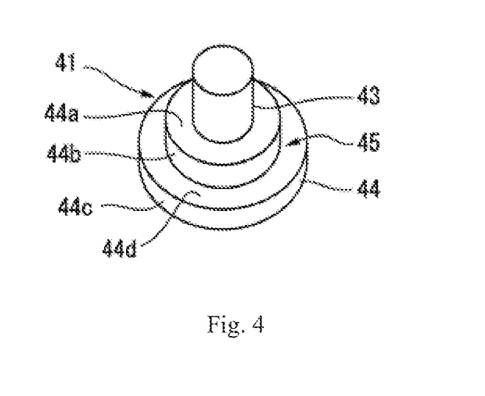
FIG. 4 is a perspective view of a base material according to the first embodiment.

An outer peripheral portion of the disc portion 44 on one end side of the disc portion 44 (cylindrical portion 43 side) is formed to have a smaller diameter than other end side. Therefore, the outer peripheral portion of the disc portion 44 is provided with a shoulder portion 45, and the shoulder portion 45 is formed by a first peripheral surface 44b extending in an axial line direction from one end surface 44a in the axial line direction of the disc portion 44 and an end surface 44d extending outward from the first peripheral surface 44b in the radial direction and connected to an outermost second peripheral surface 44c of the disc portion 44, as illustrated in FIG. 4.

In the electropotential detection electrode 11 configured in this manner, the main body portion 21 comprising the base material 41 covered with the conductor 42 on the outer surface thereof is formed by sintering the base material 41 having a metal paste applied on the outer surface thereof, as illustrated in FIG. 3. The main body portion 21 comprises the small diameter portion 23 comprising the cylindrical portion 43 of the base material 41 covered with the conductor 42 and the large diameter portion 24 comprising the disc portion 44 of the base material 41 covered with the conductor 42. The first peripheral surface 44b of the shoulder portion 45 of the disc portion 44 is covered with a conductor 42a, and the other end surface 44d is covered with a conductor 42b. Therefore, an outer peripheral portion of the large diameter portion 24 is provided with an annular recessed portion 51 by the shoulder portion 45 covered with the conductor 42a and the conductor 42b.

The electropotential detection electrode 11 according to this embodiment is assembled by attaching the terminal portion 22 to the main body portion 21 covered with the conductor 42. In order to attach the terminal portion 22 to the main body portion 21, firstly, the large diameter portion 24 of the main body portion 21 is fitted into the cylindrical body 33 of the terminal portion 22. Then, an end surface 21a of the main body portion 21 opposite from the one end having the liquid-contact portion 25 is mated with the disc 34 of the terminal portion 22. By the terminal portion 22 attached to the main body portion 21 in this manner, an annular groove 52 opening toward inside the measurement tube 13 is formed between the annular recessed portion 51 provided on the outer peripheral portion of the large diameter portion 24 and the cylindrical body 33 of the terminal portion 22, as illustrated in FIG. 3. The gasket 27 described above is accommodated in the annular groove 52.

In the electrode configured in this manner, since an outer peripheral wall of the annular groove 52 is defined by the cylindrical body 33 of the terminal portion 22, the outer peripheral wall of the annular groove 52 is not included in a conduction path made of the conductor 42. Therefore, the conduction path may be made of the conductor 42 except for portions where peeling off of the conductor 42 would tend to occur. In addition, compared with the case of the related art, that is, with a case where the conductor 42 formed in the outer peripheral wall of the annular groove 52 is included in the conduction path, corners that tend to impair the reliability in conduction are reduced, and thus reliability in conduction is increased.

Therefore, according to this embodiment, an electropotential detection electrode having high reliability in conduction may be provided irrespective of a configuration having the annular groove 52 and the main body portion 21 covered with the conductor 42.

The annular groove 52 according to this embodiment is a groove for storing the gasket 27. A portion of the main body portion 21 inside the gasket 27 in the radial direction corresponds to a seal portion. Therefore, the cylindrical body 33 of the terminal portion 22 located outside the seal portion, and thus the terminal portion 22 comprising the cylindrical body 33 does not come into contact with a fluid flowing in the measurement tube 13. Therefore, since the terminal portion 22 may be made of a cost-effective conductor, manufacturing costs may be reduced, and thus the electropotential detection electrode of an electromagnetic flow meter may be provided at low costs.

Second Embodiment

Figure 6:
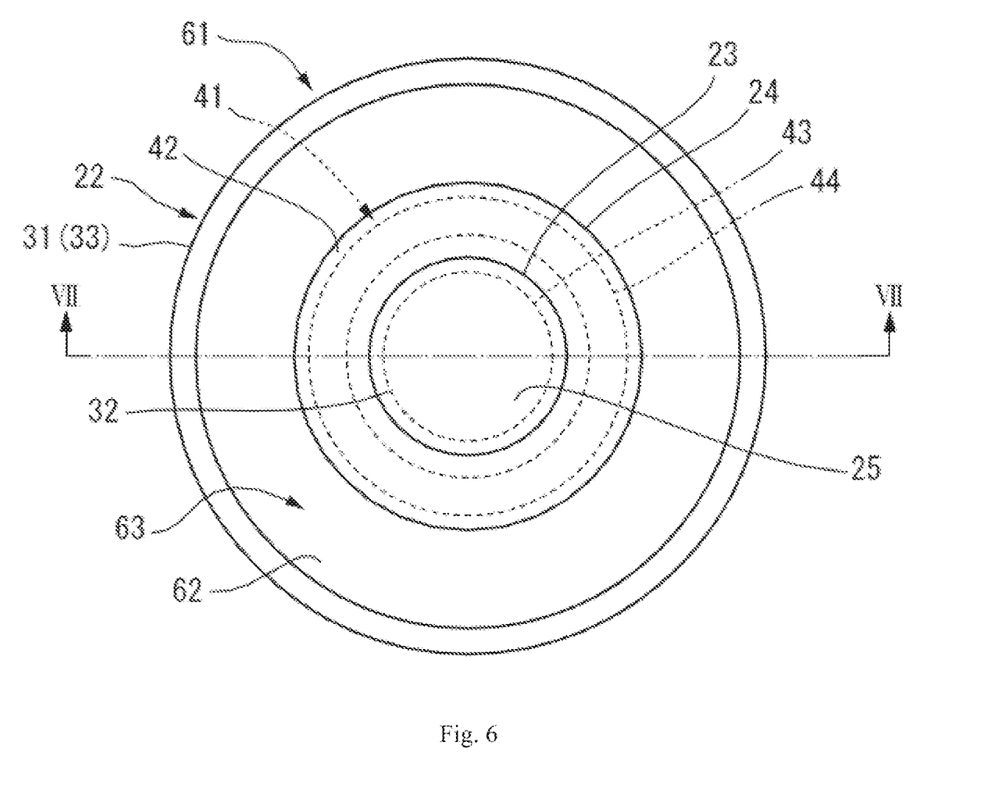
FIG. 6 is a front view of an electropotential detection electrode according to a second embodiment viewed from a pipeline side.
Figure 7:
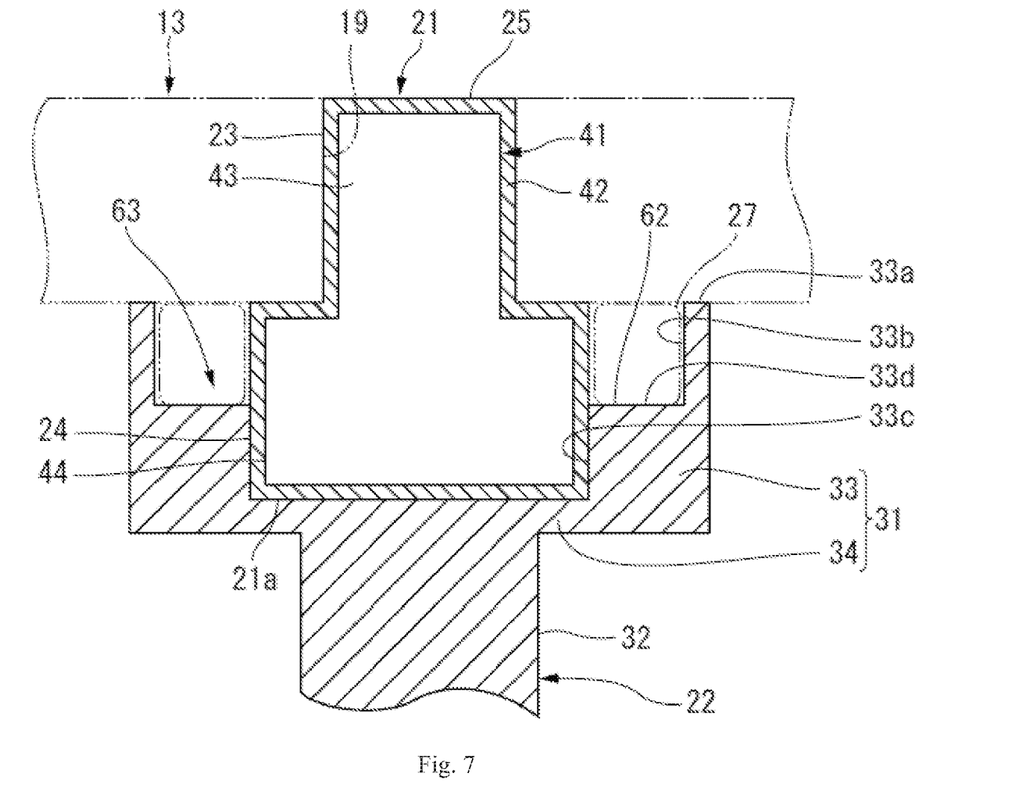
FIG. 7 is a cross-sectional view taken along the line VII-VII in FIG. 6.

The electropotential detection electrode of an electromagnetic flow meter according to the present invention may be configured as illustrated in FIG. 6 and FIG. 7. In FIG. 6 and FIG. 7, the same or similar members as or to the members described with reference to FIG. 1 to FIG. 5 will be denoted by the same reference signs and detailed description will be omitted as appropriate.

An electropotential detection electrode 61 illustrated in FIG. 6 and FIG. 7 comprises the main body portion 21 provided with the large diameter portion 24 having a disc shape without having a shoulder portion on the outer peripheral portion thereof and the terminal portion 22 provided with the cylindrical body 33 that accommodates an outer peripheral surface of the main body portion 21 fitted therein. The large diameter portion 24 of the main body portion 21 is formed to have a constant outer diameter over the entire range in the axial line direction.

The cylindrical body 33 according to this embodiment comprises a first inner peripheral surface 33$b$ extending in the axial line direction from an inner peripheral edge of an opening end surface 33$a$ and an end surface 33$d$ extending inward from the first inner peripheral surface 33$b$ in the radial direction and connected to a second inner peripheral surface 33$c$ at the inner most position of the cylindrical body 33. Therefore, the cylindrical body 33 is provided with an annular recessed portion 62 on an inner peripheral portion thereof.

In the electropotential detection electrode 61 according to this embodiment, an annular groove 63 opening toward the measurement tube 13 is formed between the annular recessed portion 62 provided on the inner peripheral portion of the cylindrical body 33 and the large diameter portion 24 of the main body portion 21 by the terminal portion 22 attached to the main body portion 21. The annular groove 63 accommodates the gasket 27.

Since the outer peripheral wall of the annular groove 63 is defined by the cylindrical body 33 of the terminal portion 22 in this embodiment as well, the electropotential detection electrode with high reliability in conduction may be provided in the same manner as the case where the first embodiment is employed.

Since the number of corners formed on the large diameter portion 24 of the main body portion 21 is reduced by one in this embodiment compared with the case where the first embodiment is employed, enhancement of reliability in conduction is advantageously achieved.

DESCRIPTION OF REFERENCE NUMERALS AND SIGNS

11: electropotential detection electrode, 12: electromagnetic flow meter, 13: measurement tube, 19: electrode insertion hole, 21: main body portion, 22: terminal portion, 23: small diameter portion, 24: large diameter portion, 25: liquid-contact portion, 27: gasket, 31: electrically conductive body, 32: shaft portion, 33: cylindrical body, 41: base material, 42: conductor, 51, 62: annular recessed portion, 52, 63: annular groove

The invention claimed is:

1. An electropotential detection electrode of an electromagnetic flow meter comprising:
   a main body portion having a liquid-contact portion and being formed by covering a base material with an electrically conductive material, the liquid-contact portion being exposed in a measurement tube of the electromagnetic flow meter; and
   a terminal portion electrically connected to the electrically conductive material, wherein the main body portion comprises:
      a small diameter portion having a cylindrical shape and being inserted at one end thereof into an electrode insertion hole of the measurement tube, the one end corresponding to the liquid-contact portion; and
      a large diameter portion having a disc shape and connected at one end thereof to another end of the small diameter portion, the large diameter portion extending outward from the small diameter portion in a radial direction, and
   the terminal portion comprises an electrically conductive body having a cylindrical body that accommodates the large diameter portion fitting therein and having a bottomed cylindrical shape electrically connected to the large diameter portion, and a shaft portion extending from the electrically conductive body in a direction opposite from the main body portion, and
   one or more of an outer peripheral portion of the large diameter portion and an inner peripheral portion of the cylindrical body is provided with an annular recessed portion that constitutes an annular groove between the large diameter portion and the cylindrical body.

2. The electropotential detection electrode of an electromagnetic flow meter according to claim 1, wherein the annular groove accommodates a gasket.

* * * * *